Nov. 20, 1962  W. N. LINDSAY  3,064,526
DUAL IMAGE REFLECTING TELESCOPE
Filed June 23, 1958  3 Sheets-Sheet 1
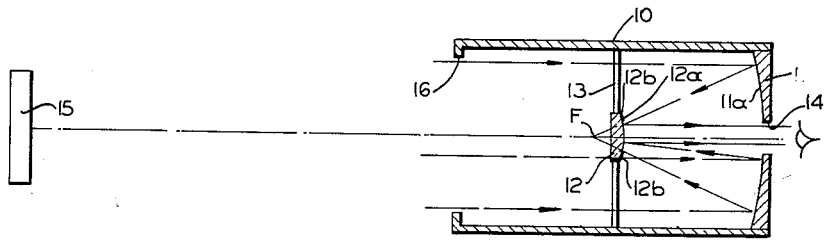
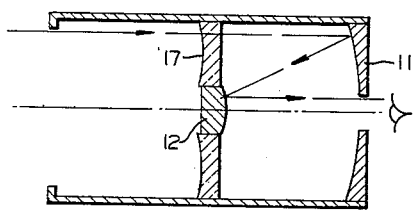
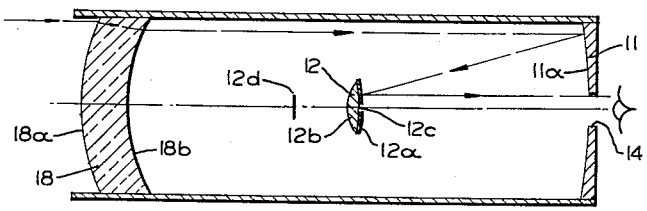
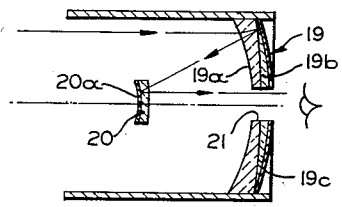
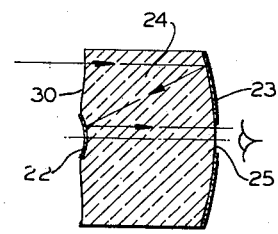
INVENTOR.
WESLEY N. LINDSAY
BY
ATTORNEYS Nov. 20, 1962  W. N. LINDSAY  3,064,526
DUAL IMAGE REFLECTING TELESCOPE
Filed June 23, 1958  3 Sheets-Sheet 2
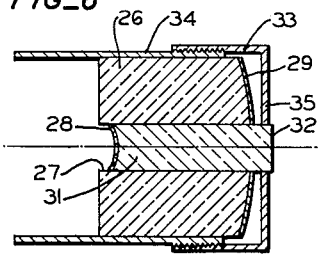
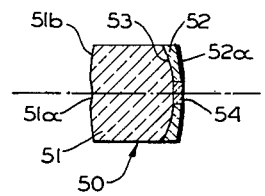
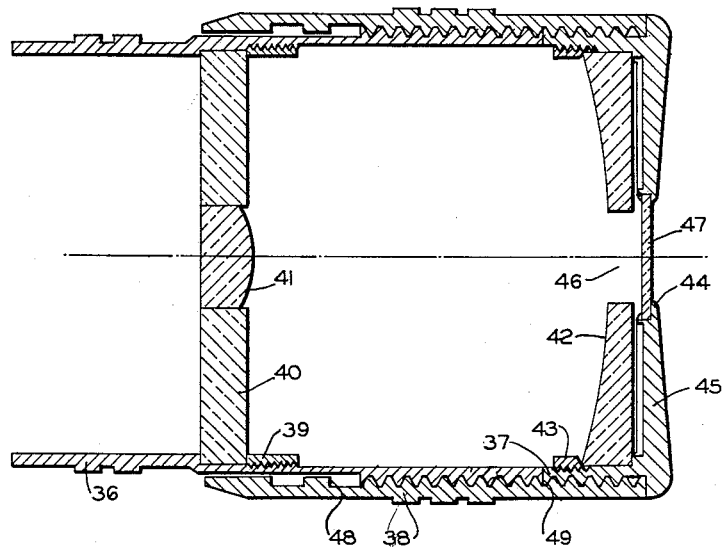
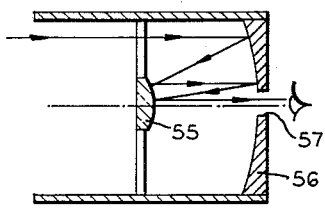
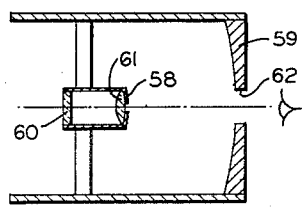
INVENTOR.
WESLEY N. LINDSAY
BY
ATTORNEYS Nov. 20, 1962 W. N. LINDSAY 3,064,526
DUAL IMAGE REFLECTING TELESCOPE
Filed June 23, 1958 3 Sheets-Sheet 3
FIG_11
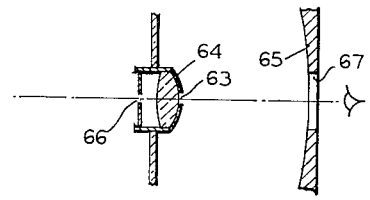
FIG_12
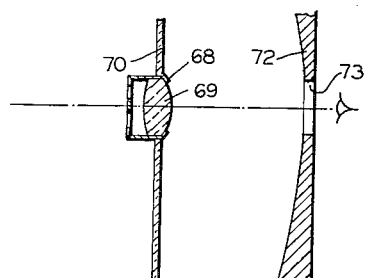
FIG_13
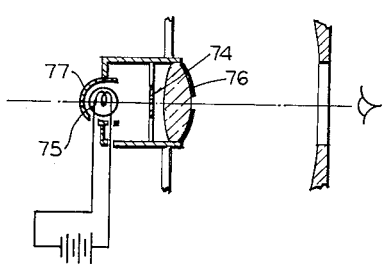
FIG_14
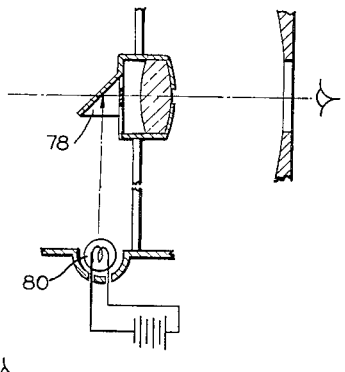
FIG_15
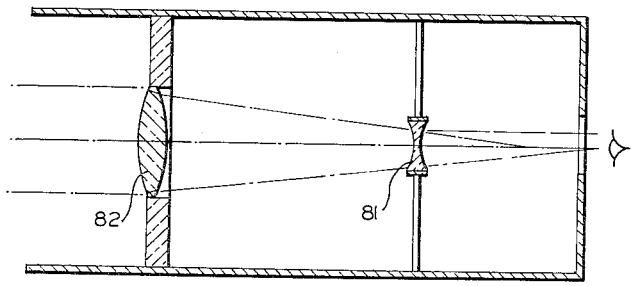
INVENTOR.
WESLEY N. LINDSAY
BY
*Allen and Chromy*
ATTORNEYS

United States Patent Office 3,064,526
Patented Nov. 20, 1962

3,064,526
DUAL IMAGE REFLECTING TELESCOPE
Wesley N. Lindsay, 10710 Ridgeview Ave.,
San Jose 27, Calif.
Filed June 23, 1958, Ser. No. 743,729
17 Claims. (Cl. 88—32)

This invention relates to optical devices such as telescopes and the like in general. More particularly this invention relates to telescopes and similar magnifying devices in which there is provided a magnified image that is positioned in an unmagnified field of view.

The first telescopes ever made, and which were probably invented in Holland, were the erect-image type made popular by Gallileo and which now bear his name. In the Gallilean telescope only two lens were used, one positive and one negative, to provide a brilliant enlarged image of a distant object which image however is of small compass. This small field of view, along with the inability to place cross hairs in the field since no real image is formed in the telescope, has limited the use of the simple Gallilean telescope to opera glasses and low power sport glasses. The Gallilean telescope is however compact, since the distance between the lenses is the difference of their focal lengths.

The telescope now in common use was invented by Kepler and was first made by using two convex lenses, the first lens or objective forming an inverted image of a distant object and the second lens or ocular acting as a magnifying glass to present an enlarged image to the eye. The Kepler telescope does not provide an erect image, but rather an inverted image, unless an additional erecting system is incorporated therein. The image can be erected by means of a third positive lens, or by means of a Porro prism system as commonly used in binoculars. Cross hairs may be placed in the plane of the image created by the objective lens, or by the erecting system, and appear superimposed on the distant object.

A practical erect-image telescope requires more lenses than the simple system described above, since a simple lens does not bring all light rays that enter the lens to a common focus, and creates a blurred image. Not only do the edge rays through the lens have a different focus than the center rays, but also light of different colors is brought to focus in different image planes. Hence a two lens objective is commonly used to correct to a degree the faults of the simple lens. Likewise, the erector system of a modern telescope contains at least three and generally four lenses to correct the defects of a simple single lens erector. If a prism system is used to erect the image, two prisms are commonly used, each with three optical surfaces, a face through which light enters, a reflecting face, and a face through which light leaves the prism. Furthermore, the ocular in even the cheapest telescopes comprises two lenses while in a good telescope the ocular may have four to six or more separate lenses. Thus a modern erect-image telescope comprises an optical system of at least seven elements and often contains more.

A loss of light occurs by partial reflection from each optical surface, and the overall reduction in light transmission in a modern telescope is relatively severe. This loss of light coupled with difficulties in properly correcting the optical system for defects in precise imaging has limited the use of this type instrument. For example, the telescopes in modern surveyor's instruments, which require precise imaging and high light transmission, commonly do not include an erecting system, and the surveyor must adapt himself to the inverted image provided, and must learn not only to recognize inverted images, but also must learn to move the telescope to the left to make the image move to the right, and to move the telescope down to make the image move up.

Even the most fully-corrected erect-image, Kepler type telescopes have a color-error which causes brightly lighted objects to have a colored halo, as the result of residual chromatic aberration of the lenses. The residual chromatic aberration can be further reduced by employing yet more optical elements; however, only at the expense of other optical aberrations which cause the image of objects off the axis of the telescope to become less sharp, as in the Gallilean telescope.

It is therefore a general object of this invention to provide a telescope with the simplicity and compactness of the Gallilean type, with cross hairs, with highly precise optical imaging and with an increased field of view.

Another object of this invention is to provide a telescope with high light transmission to provide a brilliant field of view, and with a wide range of focus for both distant objects and for close objects only a few feet or inches away.

A further object of this invention is to provide a telescope with two mirrors and an auxiliary corrector in which chromatic aberrations are substantially reduced.

Still another object of this invention is to provide an improved telescope employing two mirrors in which the light rays are passed to the eye of the user as a small bundle of parallel light rays.

Still a further object of this invention is to provide an improved telescope employing two mirrors with which a magnified view of an object positioned in an unmagnified field of view may be obtained.

Other and further objects of this invention will be apparent to those skilled in the art to which this invention relates from the following specification, claims and drawing.

Referring to the drawing briefly:

FIGURE 1 is a sectional view of an embodiment of this invention;

FIGURE 2 is a sectional view of an embodiment of this invention employing a corrector lens;

FIGURE 3 is a sectional view of an embodiment of this invention employing a corrector lens of the Maksutov type;

FIGURE 4 is a sectional view of an embodiment of this invention employing Mangin mirrors;

FIGURE 5 is a sectional view of an embodiment of this invention employing a cylinder of glass with selected curved surfaces of the ends thereof forming light reflectors;

FIGURE 6 is a sectional view of an embodiment such as shown in FIGURE 5 modified to provide adjustable focus;

FIGURE 7 is a sectional view of a tubular mount adapted to be employed for mounting the mirrors of this telescope;

FIGURE 8 is a sectional view of another modified form of this invention employing a solid glass cylinder made up of two glasses, one of high dispersion and the other of low dispersion;

FIGURE 9 is a sectional view of an embodiment of this invention employing multiple reflection between a pair of mirrors;

FIGURE 10 is a sectional view of an embodiment of this invention having a reticle incorporated therein;

FIGURE 11 is a sectional view of an embodiment of this invention with another reticle viewing arrangement;

FIGURE 12 is a sectional view of an embodiment of this invention employing a convex mirror with an annulus thereof employed for viewing a reticle;

FIGURE 13 is a sectional view of an embodiment of this invention employing a lamp for illuminating the reticle;

FIGURE 14 is a sectional view of still another arrangement employing a prism and lamp for illuminating the reticle; and FIGURE 15 is a schematic view of a telescope for producing a magnified image in an unmagnified field of view, said telescope employing a convex objective of relatively short focal length and a negative lens between the objective and the eye point.

Reference is made to the following books, Technical Optics, vol. II by Martin, published by Pitman, 1953, and Applied Optics and Optical Design by A. E. Conrady, published by Oxford University Press, 1929.

The arrangement of the optical parts in the telescope are shown in FIGURE 1. These comprise a tube 10 of metal, opaque plastic and the like for holding the concave mirror 11 and the small convex mirror 12, which is supported therein by the small radial members 13, in spaced relation. The concave surface of the mirror 11 is provided with a polished light reflecting surface 11a and the convex surface of the mirror 12 is provided with a polished light reflecting surface 12a. In the telescope of this invention no eyepiece is used, and thus are eliminated several optical surfaces which by their nature have to be made of glass and which as a consequence introduce optical aberrations which are very difficult to reduce to small values. In this telescope, light from a distant object is reflected toward the focal point F of the concave mirror 11, but it is intercepted before reaching this focal point by the reflecting surface of the small convex mirror 12. The light is reflected by the reflecting surface 12a toward the eye which is placed behind the opening 14 in the center of the concave mirror, and arrives at the eye as a bundle of parallel light rays. Magnification of the object 15 is obtained since any ray from the object making a small angle with the optical axis, leaves the telescope at an angle, which is greater by the ratio of the focal lengths of the two mirrors.

The eye therefore receives from the small mirror 12 a greatly magnified image of the distant object 15, yet it also receives from the space unobstructed by the small mirror 12, an unmagnified image of the distant object or view toward which the telescope is pointed. Hence, although the magnified image occupies a relatively small angle of view, the observer does not have the sensation of looking through a tunnel, as in the case of the Galilean telescope, since instead of blackness around the magnified image, the telescope of this invention provides a wide field of view of the terrain being sighted.

The edge of the small mirror 12 is normally out of focus to the eye since it is at a distance less than the normal near-focusing range of the eye. The small mirror edge partially obstructs the unmagnified field of view, and a circular zone appears on the small mirror in which the unmagnified view changes from one of no obstruction to one of complete obstruction in a direction from the edge toward the center of the mirror. Thus an overlap of magnified and unmagnified fields occurs in an annulus around the small mirror. This overlap may be eliminated if desired, by placing an annular opaque ring 12b around the edge of the small mirror to intercept the unmagnified image. By varying the width of the opaque ring, the magnified and unmagnified field can be made to merge one into the other either with overlap, no overlap, or with separation by a dark ring.

The size of the beam of light entering the eye from the small mirror as defined by the diameter of the exit 14, may be chosen to be smaller, equal to, or larger than the iris of the eye and its diameter may vary from 2 to 8 millimeters. For complete utilization of the light entering the telescope, the exit beam is made equal to or smaller than the iris. However, for certain purposes, such as increasing the angle of view or compass of the magnified field, the exit beam may be made larger than the iris. Since, also, a correspondence exists between the magnification and the relative diameters of the inlet beam, as defined by the opening 14, and exit beams, the exit beam diameter may be chosen appreciably smaller than the iris diameter to obtain high value of magnification with moderate diameters of the inlet beam.

When exit beams larger than the iris are contemplated, care must be taken to avoid a condition where the missing center of the exit beam, caused by the interception of the center of the incoming beam by the small mirror 12, reaches a size approximately the iris size. Should the missing center be of such diameter, then the eye placed centrally on the optical axis of the telescope would receive no light, and would only receive light if displaced from the optical axis so as to intercept light from the annular space around the missing center. However advantage may be taken of this fact by permitting rays from object space to pass undeviated to the eye through the center zone, thus creating a field of view with an unmagnified center zone surrounded by a zone in which the object is shown magnified.

Two spherical mirrors 11 and 12 used alone provide acceptable optical imaging over a very small angle with the optical axis, the angle depending on the focal length of the mirrors. In some cases a telescope made of spherical mirrors alone may provide an acceptable field of view, but the useful field can be increased by making the mirrors 11 and 12 paraboloidal mirrors rather than spherical mirrors.

Two paraboloids, one concave and one convex and with a common focal point provide indeed excellent optical imaging; third order spherical aberration, coma, and astigmatism are absent, and higher order aberrations are insignificant except for mirror focal lengths which are appreciably less than the mirror diameters. Distortion is also small and undetectable except under exacting conditions of measurement.

Two spherical mirrors plus an aspheric corrector plate of low power will also provide excellent imaging. By placing a Schmidt type corrector 17 in the focal plane of the concave mirror as shown in FIGURE 2 an optical system is obtained which is free of spherical aberration and coma. Astigmatism and distortion are very small, and are insignificant in a number of useful configurations.

The contour of the Schmidt corrector may be calculated using the formula $$\Delta x = \frac{y^4 - ky^2r^2}{4R^3(n-1)}$$

where $\Delta x$ represents the variation in thickness of the corrector expressed as a function of the distance from the axis of the telescope, R is the radius of curvature of the concave reflector 11, $n$ is the index of refraction of the corrector, $r$ is the radius of the corrector, $y$ is the radius to the point being computed, and $k$ is a constant between 0 and 4. In this formula as applied to the telescope of this invention the values of $\Delta x$ obtained are multiplied by a factor $$\left(1 - \frac{1}{M}\right)$$

where M is the magnification of the telescope. This equation may be used as a guide to the proper corrector shape and the final shape thereof may be developed by optical testing and modification.

A second method to correct the aberrations of two spherical mirrors is to use a lens 18 of the Maksutov type of small negative power ahead of the concave mirror surface 11a as shown in FIGURE 3. A convex mirror surface 12a is provided to one surface of the lens 12 which is designed for viewing the reticle 12d and for this purpose a small central area 12c is left unsilvered. This combination of elements provides excellent correction of aberrations.

The following is a set of values representing the radii and axial distances between the spherical surfaces of elements 11 and 18 shown in FIGURE 3, when said elements are made of glass having an index refraction of 1.517.

Radius of 18a=1.200 in.
 Axial distance 18a—18b=0.272 in.
Radius of 18b=1.046 in.
 Axial distance 18b—11a=2.591 in.
Radius of 11a=—3.200 in.
 Axial distance 11a—12a=—1.270 in.
Radius of 12a=—0.800 in.
 Axial distance 12a—12b=—0.070 in.
Radius of 12b=0.219 in.

The diameters of the elements are as follows:

Diameter of corrector 18=1.000 in.
Diameter of concave mirror 11=1.000 in.
Diameter of convex mirror 12a=0.300 in.
Diameter of hole 14 in concave mirror 11=0.300 in.
Diameter of unsilvered area 12c on convex mirror 12a=0.063 in.
Reticle 12d distance from surface 12b=0.400 in.

A third method of removing undesirable aberrations of spherical mirrors is to use Mangin mirrors or achromatized Mangin mirrors 19 and 20 for the two optical elements of the telescope as shown in FIGURE 4. In this combination the concave mirror 19 is made of two glass elements 19a and 19b, the glass of element 19a having a lower index of refraction than the glass of element 19b and the mirror reflecting surface 19c is placed on the rear spherical surface of the element 19b. This system is such that light rays are also reflected from the mirror 20 as a bundle of parallel rays that may be viewed through the opening 21 in the mirror 19. With this arrangement aberrations may be balanced to provide excellent imaging. This system of correction has the advantage that all optical surfaces are spherical, and this same advantage applies to the two previous systems mentioned.

An achromatized Mangin mirror telescope such as shown in FIGURE 4 may be corrected for the red end of the spectrum, and used as a component in an optical pyrometer. The constants for a suitable system are, using Conrady's notation, as follows:

Radius of front surface of 19a=—0.935 in.
Radius of rear surface of 19a and front surface of 19b=—3.240 in.
Radius of mirror surface 19c=—1.440 in.
Radius of 20=—1.250 in.
Radius of mirror 20a=—0.359 in.

The axial distances between succeeding optical surfaces following a ray of light is given in the following table:

$$d_1'=+0.050 \text{ in.}$$
$$d_2'=+0.070 \text{ in.}$$
$$d_3'=-0.070 \text{ in.}$$
$$d_4'=-0.050 \text{ in.}$$
$$d_5'=-0.570 \text{ in.}$$
$$d_6'=-0.050 \text{ in.}$$
$$d_7'=+0.050 \text{ in.}$$

The above values are given for glass elements 19a and 20 having an index of refraction of 1.513 and dispersion $V=60.5$ and glass element 19b having an index of 1.617 and dispersion $V=38.5$.

The diameter of the concave mirror 19c may be 0.9 inch and that of the convex mirror 20a may be 0.185 inch. Spherical aberration and offense against the sine condition (OSC') are within the Rayleigh limits, as given by Conrady, over a wave length range of about 580 to 700 millimicrons. The change in magnification between the C and D spectral lines is 0.1%.

All optical systems have residual aberrations, and the design problem is always one of minimizing the aberration to a point where for the intended purpose, the telescope is acceptable. All the above systems will provide precise imaging; furthermore, combinations of the above-mentioned correcting systems can be used to increase the optical corrections to any desired degree.

A fixed focus telescope shown in FIGURE 5 with only two air-glass surfaces and with excellent optical properties can be made by polishing and providing reflecting surfaces to the ends 22 and 23 of a cylinder 24 of glass, said ends having the desired curves. The end 23 of the cylinder 24 is made parabolical except for a small plane center area 25 and this end 23 is convex from the outside and concave on the glass side. The opposite end of the cylinder is hollowed out centrally to provide a paraboloidal surface 22 that is concave toward the outside and convex toward the glass. The curvatures and spacing between the surfaces are chosen to provide a common focus for the paraboloids 22 and 23 and the annular space around the small paraboloid 22 may be flat or it may be aspheric. The paraboloidal surfaces are provided with reflecting coatings of silver and the like and the outer surface of the silvering may be protected by the coatings of conventional composition.

The following data relates to the form of this invention shown in FIGURE 5, but with sperical mirrors:

Diameter of glass cylinder 24=1.00 inch
Radius of curvature of concave mirror 23=1.8223 in.
Diameter of flat surface 25 on concave mirror=0.25 in.
Radius of curvature of convex mirror 22=0.3000 in.
Diameter of convex mirror 22=0.25 inch
Axial separation of mirrors 22 and 23=0.75 inch Deviation of corrector surface 30 from a plane is as follows:

| Radial distance from center, inch | Deviation, inch |
|---|---|
| 0.2 | .00056 |
| 0.3 | .00096 |
| 0.4 | .00096 |
| 0.5 | .00000 |

Index of refraction of glass $n_D=1.517$

Focusing is incorporated into this solid type highly corrected telescope by drilling a hole 27 concentric with the cylindrical block 26 of glass, with a diameter slightly larger than the diameter of the small mirror 28 as shown in FIGURE 6. One end 29 of the cylinder 26 is shaped paraboloidal as in the form shown in FIGURE 5 and the other end 30 is surfaced flat. The hole 27 is optically polished to form a true cylinder. The small paraboloidal mirror 28 is formed into the end of an optically polished glass rod 31 which precisely fits and slides in the hole 27 in the larger cylinder 26. The opposite end 32 of the small cylinder is given an optical and plane finish so that the object may be viewed through this end and the length of the small cylinder corresponds closely to the length of the large cylinder. A minute quantity of lubricant may be applied to the mating cylindrical surfaces between the rod 31 and the cylinder 26 and is chosen to have a refractive index near that of the glass. Dirt seals are provided at each end of the small cylinder. Focusing in this form of the telescope is accomplished by sliding the small cylinder 31 in respect to the large cylinder 26 by rotating the tube 33 which is threaded to the tube 34 and which is attached to the rod 31 by means of the disc member 35.

Two spherical mirror surfaces rather than paraboloidal surfaces can be used in the constructions shown in FIGURES 5 and 6 by shaping the flat annular surface 30 which surrounds the convex mirrors 22 and 28 so as to correct for the aberrations introduced by the spherical surfaces.

The mirrors such as the mirrors 11 and 12 illustrated in FIGURES 1 and 2 may be mounted as shown in FIGURE 7 where two front surfaced spherical mirrors are held in a mount comprising a front tube 36, a rear tube 37 and an outer tube 38 that is threaded to the tubes 36 and 37. The front tube 36 is provided with a threaded ring 39 for holding the corrector plate 40 therein so that this plate and the small mirror 41 may be moved toward or away from the concave mirror 42 by rotation of the front tube 36 in respect to the tubes 37 and 38. The tube 38 is firmly threaded to the tube 37 which is provided with a back 45 and the concave mirror 42, which is held in the tube 37 by the threaded ring 43, is positioned adjacent the inner wall of said back. The aperture 46 through the mirror 42 is aligned with the hole 44 of the back 45 and a glass disc 47 may be positioned in the hole 44 to keep dust from entering this hole. The aperture 46 is a transparent area that is not provided with a mirror coating so that the parallel bundle of light rays reflected from the mirror 41 may pass therethrough to the eye of the viewer. This mounting also provides positive stops 48 and 49 for the longitudinal motion of the corrector 40 and mirror 41 mounting tube 36 with respect to the tube 38.

The lens shade portion of the tube 36 which protrudes in front of the corrector plate 40 may be eliminated if desired. It reduces the unmagnified image field of view, but reduces glare caused by strong light falling directly on the corrector 40.

The embodiment of this invention shown in FIGURE 7 may be constructed using the following dimensions:

Radius of curvature of concave mirror 42=3.2 inches
Diameter of concave mirror 42=1.6 inches
Diameter of perforation 46 in concave mirror=0.37 inch
Radius of curvature of convex mirror 41=0.4 inch
Diameter of convex mirror 41=0.4 inch
Diameter of corrector 40=1.6 inches
Thickness of corrector 40=0.15 inch
Deviation in thickness of corrector 40 from a plane:

| Radial distance from center, inch | Deviation, inch |
| --- | --- |
| 0.2 | 0.0003 |
| 0.4 | 0.0010 |
| 0.5 | 0.0013 |
| 0.6 | 0.0013 |
| 0.7 | 0.0010 |
| 0.8 | 0.0000 |

Axial separation of mirrors 41 and 42=1.2 inches
Index of refraction of corrector 40=1.517 inches Another embodiment of the solid-type telescope is shown in FIGURE 8 in which portions of the ends of a glass cylinder 50 are finished of spherical rather than paraboloidal shape. The cylinder 50 is made up of two parts 51 and 52, the portion 51 comprising glass of low dispersion and the portion 52 comprising glass of high dispersion. These two parts 51 and 52 are cemented together along the spherical surfaces 53 thereof. The area 51a at the front of the element 51 is of concave shape and it is provided with a mirror surface which receives light reflected to it by the mirror 52a on the convex back of the element 52. The front area 51b of the element 51 surrounding the area 51a is also of spherical shape and as a result slight magnification of the relatively large field of view surrounding the magnified narrow field, is obtained in this embodiment. Also the central aperture through the concave mirror 52a is provided with a glass insert having the same index of refraction as the element 51. This glass insert is ground with a spherical concave surface fitting against the element 51 to which it is cemented and the rear surface 54 thereof is also spherical with a relatively long radius.

The following is a set of values representing the radii, axial distances between the spherical surfaces of the elements employed in the embodiment shown in FIGURE 8:

Radius of 51b=2.530 in. Axial distance 51b—53= 0.660 in. $N_1'$=1.530. $V$=51.2
Radius of 53=0.830 in. Axial distance 53—52=0.070 in. $N_2'$=1.734. $V$=51.0
Radius of 52a=1.786 in. Axial distance 53—51a=0.647 in.
Radius of 51a=0.375 in. Axial distance 51a—54=0.710 in.
Radius of 54=2.280 in.
Diameter of telescope=0.74 in.
Diameter of convex mirror 51a=0.17 in.

The refractive index of the glass 51 is 1.530 and dispersion is 51.2 while the index of the glass 52 is 1.734 and dispersion is 51.0.

The two mirror telescope previously described involved one reflection from a concave mirror and one reflection from a convex mirror. For some purposes an exceptionally long focal length telescope of high magnification is desired and an instrument for this purpose is illustrated in FIGURE 9 wherein the mirrors 55 and 56 are arranged so that the light which is reflected by the convex mirror 55 impinges a second time on the concave mirror 56, rather than passing through the transparent aperture 57 into eye-space as before, and is returned a second time to the convex mirror 55, closer to the axis than after the first reflection. After a second reflection from the convex mirror 55 the beam then passes into eye-space as a bundle of parallel light rays. The magnification obtained by the double reflection in comparison to the magnification from a single reflection is the square of the single reflection value. A choice of mirrors with focal lengths in the ratio of four to one would give a magnification of four for one reflection, or sixteen for two reflections. The field of view is of course reduced in the double reflection instrument, but for some applications, for example, precision sighting on small targets, a limited magnified field of view may be actually desirable. In the arrangement outlined, that outer portion of the convex mirror which receives the first reflection from the concave mirror also serves an annulus to separate the unmagnified and magnified fields of view. It it apparent, therefore, that very high magnification can be obtained in telescopes of compact design and containing as few as two optical surfaces.

In the Gallilean telescope, no real image is formed, and furthermore, the virtual image which the eye lens presents to the eye is located in eye-space behind the preferred eye-point and therefore no convenient position for the location of cross-hairs is available in this type of telescope. In the two mirror type of telescope of this invention, no real image is formed in the instrument, but the virtual image which the small convex lens presents to the eye is located at the common focus F of the two mirrors 11 and 12 shown in FIGURE 1. Since this point lies in front of the two mirrors in object space suitable cross-hairs may be located at this common focus and such cross hairs are then in the plane of the object, and if it were not for the opacity of the convex lens, they would appear accurately superimposed on the object.

Several means have been discovered to make the cross hairs, or a reticle, visible to the eye when placed at the common focus point.

A telescope incorporating cross hairs superimposed on the object is illustrated in FIGURE 10 wherein use is made of a partially silvered convex mirror 58 which reflects most of the light received from the concave mirror 59, but which is slightly transparent. A reticle 60 bearing luminous cross-hairs which may be in the form of transparent lines marked through an opaque coating on the reticle is placed at the focus of the concave mirror 59. Interposed between the reticle and the convex mirror surface 58 is a lens system 61 or mirror-lens system which when taken together with the convex mirror surface 58, causes the light passing through the transparent areas of the reticle to be formed into parallel rays. These rays join the parallel rays reflected from the surface of the convex mirror, and the combined beam is received by the eye positioned behind the transparent aperture 62. Thus bright lines, appear precisely superimposed in the object, and since they are precisely in the focal plane of the concave mirror, will appear stationary in respect to the object, even though the eye may be moved about. This system is free of parallax and hence is suited for use in precision sighting equipment.

Another method of providing cross hairs differing from the arrangement described above only in the nature of combining the light beams may be employed as shown in FIGURE 11 and in this method use is made of the fact that the center area 63 of the convex mirror 64 does not receive light from the concave mirror 65 by reason of the shadow it casts on the concave mirror. This area 63 of the mirror 64 is therefore left unsilvered, and the remaining mirror surface is given a fully-reflecting coating. An imaging system 66 similar to the reticle 60 is placed behind the convex mirror 64 in object space, and as before images the luminous lines at infinity. The light beams, one from the object to be viewed and the other from the luminous lines 66, are thus concentric with one another, and upon passing through the lens of the eye positioned behind the opening 67, they are combined on the retina of the eye into a single image. As before, the eye sees the bright lines 66 superimposed in the object, and the system is free from parallax.

The outer annulus 68 on the convex mirror 69 shown in FIGURE 12 also may be used to image the reticle or its equivalent and the center of the mirror 69 may then be made fully reflecting. In this modification the convex mirror 69 is supported in the tube 71 by the glass disc 70 which may be an aspheric corrector lens as previously described, and the concave mirror 72 provided with the viewing aperture 73 is also positioned in the tube 71. In this modification the beam of light from the object is surrounded by an annular beam from the reticle, and the two beams are combined by the eye to form parallax free bright lines superimposed on the object.

Illumination for the reticle can be the normal incident light on the front of the telescope, as shown in FIGURES 10 and 11 or it can be furnished by a light 76 supported in a reflector 77 on the optical axis of the telescope on the side of the reticle 74 away from the convex mirror 76 as shown in FIGURE 13. Illumination may also be provided by placing a small glass prism 78 on the object side of the reticle 79 to receive light from a source such as a lamp 80, placed to one side and out of the incoming light beam to the telescope. The prism may be furnished with curved surfaces to illuminate the reticle with a cone of light wide enough to fill the reticle imaging system, or separate lens may be used for this purpose.

Self-luminous cross-hairs in the form of electrically heated wires may also be placed in the focal plane, rather than a reticle.

Each of the reticle supporting viewing and illuminating embodiments shown in FIGS. 10, 11, 12, 13 and 14 may be employed with each of the embodiments shown in FIGS. 1, 2, 3, 4, 5, 6, 7, 8 and 9 by adding the reticle and reticle viewing optics to these embodiments, making the appropriate modifications as shown in FIGS. 10–14, required in each case.

In those devices described herein where the reticle image and object image combine in the eye, the eye may be positioned so as to receive or not to receive light from both beams and it is possible to cause the reticle lines to appear and disappear. When focusing on difficult targets, a slight movement of the eye can be used to remove temporarily the reticle lines from the field and thus increase the definition of the object. By another slight motion, the reticle lines can again be made visible, and note can be taken whether they are positioned as desired on the object.

A telescope with both magnified and unmagnified fields of view may be constructed as shown in FIGURE 15 and in such an instrument the eye must be placed away from the negative lens 81 in order that the unmagnified field may be seen. Under these circumstances, the size of the magnified field will be less than in the instrument employing mirror systems described, since to obtain a short distance between the exit pupil (image of the objective in the negative lens) and the eye, the objective lens 82 must have a short focal distance, which makes it expensive when properly corrected for aberrations, whereas it is relatively simple to obtain satisfactory imaging with a F:1 mirror. In such a device normally six or more glass lens elements are required to obtain a lens of comparable optical correction. As the objective focal length is shortened, the focal length of the concave lens 81 must also be shortened to maintain a given magnification, and it is well known that the aberrations of the negative lens are hard to correct for short focal lengths.

The two mirror erect image telescope of this invention may be used as a search telescope as it offers an unmagnified field of view of forty degrees, or even more if needed. By comparison a standard 8 power telescope or monocular offers at most a field of view of eight degrees. This telescope also permits effective use of the fringe vision of the eye with little if any sacrifice of seeing ability for the following reason. It is well known the angle of acute vision is small, and at five degrees from the fovea of the eye visual acuity is only one-third of its maximum value which it has at the fovea. Hence whenever an object is to be closely perceived, the eye and head are rotated to bring the image of the object into the fovea. However, the peripheral zone, of the eye is sensitive to motion, perhaps even more so than the fovea. Hence for search work, much ability to perceive motion is lost by blinding the eye to all but eight degrees or so of object field. In this telescope, the magnified image is presented over six to fifteen degrees of the eye, depending on the magnification, thus covering that area of the eye which has high visual acuity. At the same time the peripheral vision is relatively unimpaired. Furthermore, the peripheral vision angle is not impaired by increases in magnification of the central image, whereas in the standard type monoculars, the total visible field becomes markedly smaller as the power is increased, dropping to three degrees in object space for a good 20-power monocular.

Location of a particular object in the magnified field is especially simple with this telescope, since only a slight motion is required to transfer the object from the unmagnified to the magnified field. With a standard monocular, the entire instrument has to be moved from a position away from the eye, the exit pupil aligned with the eye and the desired object brought into the field of view by tilting the monocular one way or the other.

The simple construction of this telescope and resultant compactness and light weight make possible the construction of binoculars which if desired can be mounted in an eye glass frame and worn on the head. The telescopes may be mounted so that the magnified field falls above or below the normal line of sight to provide an essentially unobstructed field of view. By a slight tilt of the head, any object can be immediately brought into the magnified field of view for detailed inspection with a minimum of lost time and motion.

The rugged construction of the solid type telescope has real advantages for service under severe conditions of use. Since there is little to get out of adjustment, even under severe impact, the solid type telescope is also especially resistant to corrosive conditions and to fungus attack.

This telescope is especially suited for use in transits, levels, cathetometers and the like. Since it is not necessary to bring the iris of the eye to the exit pupil of the telescope, as is required in the standard type, the eye position is less critical. The eye can be placed at a relatively large or relatively small distance from the telescope at the option of the user. The rugged construction and compact shape of this telescope is of considerable utility in these applications. For cathetometer work, the very large focal range is also of particular utility.

A further use of this telescope is in precision optical alignment equipment. The optical axis of the telescope can be brought into superposition with the axis of a second fixed position telescope and target by noting and correcting for any deviation of the target image in the fixed telescope before and after the movable telescope is placed between the target and fixed telescope.

The telescope construction with the clear center view has special utility for this service, since both the magnified and unmagnified fields are visible at any distance from the telescope.

This telescope may also be used as a camera lens attachment to provide a compact telephoto lens with unusual qualities. The double field of view can be used to advantage to pin-point the position of some object in relation to its surroundings. It may also be used as a television camera lens attachment so that a detailed view of some particular bit of action can be presented, and at the same time a wide field of view of the surroundings can be had. Thus the loss of action around the point of interest is avoided. For example, in televising a football game, a detailed view of the ball carrier may be presented without losing, as at present, a view of the rest of the team players.

The values furnished in connection with the embodiments of this invention shown in FIGURES 3, 4, 5, 7 and 8 are supplied only for the purpose of showing examples and it is of course obvious that numerous other values may be worked out for these and for the other embodiments shown.

While I have shown preferred embodiments of the invention it will be understood that the invention is capable of further variation and modification from the forms shown so that its scope should be limited only by the scope of the claims appended hereto.

I claim:

1. In a highly compact telescope for providing a substantially unmagnified field of view extending over a relatively wide angle and for simultaneously provding a distinct magnified image which is at least partially surrounded by the substantially unmagnified field of view so that the magnified image and the unmagnified field can be viewed simultaneously without confusion to the viewer's eye, the combination of a concave mirror positioned to receive light from an object to be magnified, said concave mirror having a relatively small viewing opening therein to pass an exit pencil of rays, a convex mirror having a focal length equal to a fraction of the focal length of said concave mirror and being positioned so that its focal point substantially coincides with the focal point of said concave mirror to receive light reflected from said concave mirror, said convex mirror being small compared to said concave mirror, said convex mirror in cooperation with said concave mirror being adapted to reflect light from any given point of the object as substantially parallel light rays through said viewing opening to provide an erect magnified image of said object for viewing and an opaque ring substantially surrounding said exit pencil of light rays positioned substantially in the plane of said convex mirror for maintaining the magnified image separate and distinct from the unmagnified field which at least partially surrounds the unmagnified field which at least partially surrounds the magnified image which is recognizable throughout its extent and visible for viewing simultaneously therewith.

2. In a highly compact telescope for providing a substantially unmagnified field of view extending over a relatively wide angle and for simultaneously providing a distinct magnified image which is at least partially surrounded by the substantially unmagnified field of view so that the magnified image and the unmagnified field can be viewed simultaneously without confusion to the viewer's eyes, the combination of a concave light reflecting surface positioned to receive light from an object to be magnified, said concave surface having a relatively small transparent viewing area to pass an exit pencil of rays, a convex light reflecting surface having a focal length equal to a fraction of the focal length of said concave surface and being positioned so that its focal point substantially coincides with the focal point of said concave surface to receive light reflected from said concave surface, said convex surface being small compared to said concave surface, said convex surface in cooperation with said concave surface being adapted to reflect light as substantially parallel light rays through said transparent viewing area to provide an erect magnified image of said object for viewing and an opaque ring substantially surrounding said exit pencil of light rays positioned substantially in the plane of said convex light reflecting surface for maintaining the magnified image separate and distinct from the unmagnified field which at least partially surrounds the magnified image which is recognizable throughout its extent and visible for viewing simultaneously therewith the unmagnified image around said magnified image is viewed through said transparent viewing area.

3. In a telescope for providing a substantially unmagnified field of view extending over a relatively wide angle and for simultaneously providing a magnified image substantially in the center of the substantially unmagnified field of view, as set forth in claim 2, a corrector lens positioned to transmit light to said concave surface, said corrector lens also being positioned to transmit the light to form the substantially unmagnified image viewed through said transparent viewing area.

4. In a telescope for providing a substantially unmagnified field of view extending over a relatively wide angle and for simultaneously providing a magnified image substantially in the center of the substantially unmagnified field of view, as set forth in claim 2, further characterized in that one of said light reflecting surfaces is of spherical shape and the other is of aspheric shape.

5. In a telescope for providing a substantially unmagnified field of view extending over a relatively wide angle and for simultaneously providing a magnified image substantially in the center of the substantially unmagnified field of view, as set forth in claim 2, further characterized in that the said light reflecting surfaces are both spherical, and a corrector lens of the Schmidt type positioned substantially in the focal plane of said concave surface to transmit light to said concave surface.

6. In a telescope for providing a substantially unmagnified field of view extending over a relatively wide angle and for simultaneously providing a magnified image substantially in the center of the substantially unmagnified field of view, as set forth in claim 2, further characterized in that the said light reflecting surfaces are both spherical, and a corrector lens of the Maksutov type of small negative power positioned ahead of the focal plane of said concave surface to transmit light to said concave surface.

7. In a telescope for providing a substantially unmagnified field of view extending over a relatively wide angle and for simultaneously providing a magnified image substantially in the center of the substantially unmagnified field of view, as set forth in claim 2, further characterized in that the said light reflecting surfaces are both spherical Mangin type mirrors.

8. In a telescope for providing a substantially unmagnified field of view extending over a relatively wide angle and for simultaneously providing a magnified image substantially in the center of the substantially unmagnified field of view, as set forth in claim 2, further characterized in that the said reflecting surfaces are positioned on the ends of a cylinder of transparent material.

9. In a telescope for providing a substantially unmagnified field of view extending over a relatively wide angle and for simultaneously providing a magnified image substantially in the center of the substantially unmagnified field of view, as set forth in claim 8, further characterized in that the surface of said transparent cylinder surrounding said convex reflecting surface is provided with a corrector surface.

10. In a telescope for providing a substantially unmagnified field of view extending over a relatively wide angle and for simultaneously providing a magnified image substantially in the center of the substantially unmagnified field of view, as set forth in claim 2, further characterized in that the said concave reflecting surface is positioned on one end of a cylinder of transparent material, said cylinder having a hole formed therethrough parallel to the axis thereof, a plug of transparent material movably fitting into said hole, said plug having the said convex reflecting surface positioned on one end thereof to receive light reflected from said concave reflecting surface, and means for moving said plug to adjust the focus of the telescope.

11. In a telescope for providing a substantially unmagnified field of view extending over a relatively wide angle and for simultaneously providing a magnified image substantially in the center of the substantially unmagnified field of view, as set forth in claim 10, further characterized in that a lubricant is provided between said plug and the surface of said hole, said lubricant having an index of refraction corresponding substantially to that of the transparent material of said cylinder and said plug.

12. In a telescope for providing a substantially unmagnified field of view extending over a relatively wide angle and for simultaneously providing a magnified image substantially in the center of the substantially unmagnified field of view, as set forth in claim 2, further characterized in that said reflecting surfaces each comprise front surface mirrors, a cylinder of transparent material positioned between said reflecting surfaces, the end of said cylinder adjacent to the spherical concave mirror comprising a glass of high dispersion, and the end of the cylinder adjacent to the spherical convex surface comprising a glass of low dispersion, the radius of interface between the two glasses being such as to compensate for the spherical aberration of the mirrors, and the radius of the surface adjacent to the convex mirror being such as to compensate for the chromatic aberration of the interface.

13. In a telescope for providing a substantially unmagnified field of view extending over a relatively wide angle and for simultaneously providing a magnified image substantially in the center of the substantially unmagnified field of view, as set forth in claim 2, further characterized in that a reticle is positioned substantially in the focal plane of said reflecting surfaces centered on the axis of symmetry of said surfaces, said convex reflecting surface having a transparent area in the center thereof, and an optical system aligned with said transparent area so that the focus of the optical system coincides with the focal plane of said reflecting surfaces and so that said reticle may be viewed through said transparent area and said optical system from said viewing area, said reticle also being imaged at infinity.

14. In a telescope for providing a substantially unmagnified field of view extending over a relatively wide angle and for simultaneously providing a magnified image substantially in the center of the substantially unmagnified field of view, as set forth in claim 13, further characterized in that there is provided a light source for illuminating said reticle.

15. In a telescope for providing a substantially unmagnified field of view extending over a relatively wide angle and for simultaneously providing a magnified image substantially in the center of the substantially unmagnified field of view, as set forth in claim 2, further characterized in that a reticle is positioned substantially in the focal plane of said reflecting surfaces centered on the axis of symmetry of said surfaces, and a transparent area of annular shape is positioned around said convex reflecting surface, said reticle being viewed through said annular area.

16. A highly compact telescope as set forth in claim 2, further a corrector lens of the Schmidt type, said corrector lens being adapted to support said convex surface, a tubular member having a back wall, means for mounting said concave surface in said tubular member adjacent to the inner surface of the back wall thereof, a second tubular member slideably positioned in said first tubular member, means for supporting said corrector lens in said second tubular member whereby said corrector lens and said convex surface are adjustable with respect to said concave surface, said back wall having an aperture in alignment with said transparent viewing area so that the telescope may be used by holding said aperture up to the eye and observing the magnified and unmagnified images therethrough.

17. In a highly compact telescope for providing a substantially unmagnified field of view extending over a relatively wide angle and for simultaneously providing a magnified image substantially in the center of the substantially unmagnified field of view, the combination of a concave mirror positioned to receive light from an object to be magnified, said concave mirror having a relatively small viewing opening therein to pass an exit pencil of rays, a convex mirror having a focal length equal to a fraction of the focal length of said concave mirror and being positioned so that its focal point substantially coincides with the focal point of said concave mirror to receive light reflected from said concave mirror, said convex mirror being small compared to said concave mirror, and means for adjusting said mirrors with respect to each other to bring the magnified image into focus, said convex mirror in cooperation with said concave mirror being adapted to reflect light from any given point of the object as substantially parallel light rays through said viewing opening provide an erect magnified image of said object for viewing an opaque ring substantially surrounding said exit pencil of light rays positioned substantially in the plane of said convex mirror for maintaining said magnified image separate from the substantially unmagnified field so that said magnified image is separate and distinct therefrom as the two are viewed simultaneously through said viewing opening.

References Cited in the file of this patent

UNITED STATES PATENTS

| | | |
|---|---|---|
| 1,578,899 | Lohmann | Mar. 30, 1926 |
| 2,378,301 | Kaprelian | June 12, 1945 |
| 2,413,286 | Buchele | Dec. 31, 1946 |
| 2,485,345 | Ackerman | Oct. 18, 1949 |
| 2,608,129 | Taylor | Aug. 26, 1952 |
| 2,638,814 | Keuffel et al. | May 19, 1953 |
| 2,707,423 | Back | May 3, 1955 |
| 2,730,013 | Mandler | Jan. 10, 1956 |
| 2,891,437 | Tripp | June 23, 1959 |
| 2,923,202 | Trimble | Feb. 2, 1960 |

FOREIGN PATENTS

| | | |
|---|---|---|
| 350,651 | Germany | Mar. 21, 1922 |

OTHER REFERENCES

"Report on Survey of Optical Aids for Subnormal Vision," Ellerbrock, article in the "Journal of the Optical Society of America," vol. 36, No. 12, December 1946 (pp. 679–695; pp. 680 and 681 cited).